July 3, 1951 — W. F. WIENHOLTZ — 2,559,206

SCREW DRIVER HAVING EXPANDABLE BIT PORTION

Filed March 14, 1947

INVENTOR.
WILLIAM F. WIENHOLTZ
BY Victor J. Evans & Co.
ATTORNEYS

Patented July 3, 1951

2,559,206

UNITED STATES PATENT OFFICE 2,559,206

SCREW DRIVER HAVING EXPANDIBLE BIT PORTION

William F. Wienholtz, Elgin, Ill.

Application March 14, 1947, Serial No. 734,758

1 Claim. (Cl. 145—50)

This invention relates to screw-drivers and more particularly to improvements in combined screw-driver and screw holders.

In many instances, screws are accessible with considerable difficulty due to their location in machines, and other places. After the screw has been removed from the machine or other part with the ordinary screw driver, the screw falls into a location from which it can be extracted only after a tedious operation requiring undue length of time. Also, in inserting screws with the ordinary screw driver, it is required that the screw be held by one hand.

It is, therefore, an object of this invention to provide a combined screw driver and screw holder, which does not require the screw to be held by the hand, and which enables a screw to be extracted without danger of the screw dropping into a difficultly accessible place.

A further object is to provide a screw holder in which the shank is split and a wedge inserted therein to spread the split portions to firmly hold a screw.

These and other objects are attained by the novel construction and arrangement of parts hereinafter described and illustrated by the accompanying drawings, forming a part hereof, and in which.

Figure 1:
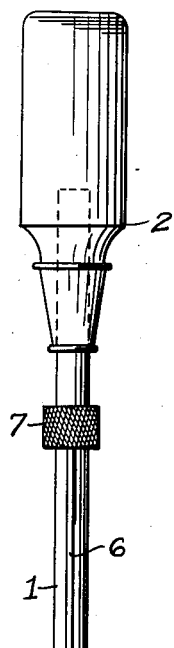
Fig. 1 is a side view of a screw driver and screw holder embodying the invention.
Figure 2:
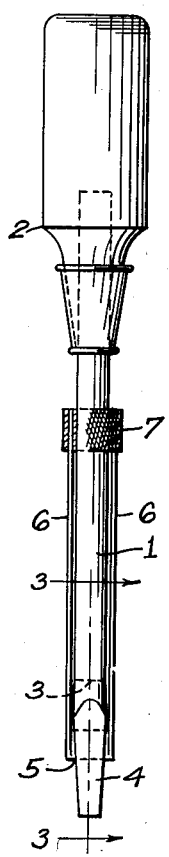
Fig. 2 is a front view of the device.
Figure 4:
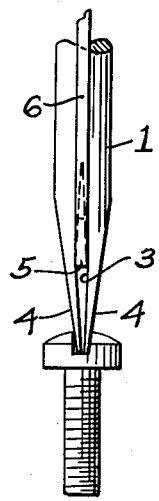
Fig. 4 is an enlarged side view of the lower portion of the device inserted in the head of a screw.
Figure 3:
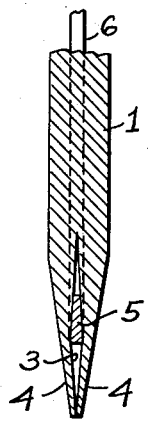
Fig. 3 is a sectional view taken on the line 3—3 of Fig. 2.

Referring to the drawings, the screw driver and screw holder is shown to comprise a shank 1 to which is attached a handle 2, the shank being split as shown at 3 a distance of about one-third its length below the handle, to provide two resilient jaws 4, the shank being formed from a metal having resilient characteristics.

Attached to the side of the wedge 5 are rods 6 which extend up and are connected to a ring 7. The wedge is made of metal and is inserted in the slit 3 near the upper end thereof. After the insertion of the wedge in the slit, the jaws 4 are bent together again. The ring 7 is knurled for easy manipulation.

In operation, moving the wedge towards the jaws 4 causes them to spread apart. When the wedge 5 is moved towards the handle, the resilient jaws 4 spring back together. The wedge is spaced from the point of the jaws so that it will not force a screw from the jaws.

It will be seen that to insert a screw in an object, the jaws are inserted in the slot in the screw, the jaws being close together. The wedge is then moved towards the jaws to firmly hold the screw, and it is not necessary to use a hand to hold the screw.

Similarly, a screw can be extracted without requiring the screw to be held by the hand.

The above description is to be considered as illustrative and not limitative of the invention of which modifications can be made without departing from the spirit and scope as set forth in the appended claim.

The invention having been described, what is claimed is:

In a combined screw driver and screwholder, a shank having a handle at one end, the other end of said shank being formed into a screwengaging bit portion, a split in said portion providing a pair of resilient jaws that in normal position are in contact with each other, said split converging upwardly into the shank from a central point and converging downwardly into said jaws from the same point a wedge positioned in the split in said shank, said wedge having the narrow edge thereof extending upwardly in said split and being movable in said split in either direction, a knurled ring surrounding said shank at a point above said split, and a pair of rods extending along the opposite sides of said shank with the lower ends of said rod secured to the opposite ends of the wedge and the upper ends of the rods secured to said knurled ring, and connecting said wedge and knurled ring for simultaneous movement whereby when said knurled ring is moved along said shank, said wedge is moved along said split in either direction, thereby spreading said jaws to move them into contact with the sides of the slot in the slotted head of a screw.

WILLIAM F. WIENHOLTZ.

REFERENCES CITED

The following references are of record in the file of this patent:

UNITED STATES PATENTS

| Number | Name | Date |
| --- | --- | --- |
| 1,108,299 | Wisman | Aug. 25, 1914 |
| 1,563,064 | Beardmore | Mar. 24, 1925 |
| 1,688,181 | Fink | Oct. 16, 1928 |
| 1,846,857 | Gibson | Feb. 23, 1932 |

FOREIGN PATENTS

| Number | Country | Date |
| --- | --- | --- |
| 100,965 | Sweden | Feb. 25, 1941 |